United States Patent [19] [11] 4,245,251
Steckler et al. [45] Jan. 13, 1981

[54] AFPC PHASE DETECTOR WITH NO OUTPUT FROM ALTERNATE SYNC PULSES

[75] Inventors: Steven A. Steckler, Clark; Alvin R. Balaban, Lebanon, both of N.J.

[73] Assignee: RCA Corporation, New York, N.Y.

[21] Appl. No.: 37,401

[22] Filed: May 9, 1979

[51] Int. Cl.³ .............................................. H04N 5/04
[52] U.S. Cl. .................................... 358/158; 358/155
[58] Field of Search ............... 358/148, 155, 158, 159; 331/18, 20; 328/165

[56] References Cited

U.S. PATENT DOCUMENTS

| 3,688,037 | 8/1972 | Ipri | 358/158 |
| 3,846,584 | 11/1974 | Itoh | 358/158 |
| 3,878,335 | 4/1975 | Balaban | 358/158 |
| 4,144,544 | 3/1979 | Fernsler | 358/158 |

Primary Examiner—Howard W. Britton
Assistant Examiner—Michael A. Masinick
Attorney, Agent, or Firm—E. M. Whitacre; W. H. Meise; W. B. Yorks, Jr.

[57] ABSTRACT

A gating circuit coupled to the phase detector of an AFPC loop prevents response of the phase detector to alternate sync pulses during the equalizing and vertical sync pulse interval.

9 Claims, 7 Drawing Figures

AFPC PHASE DETECTOR WITH NO OUTPUT FROM ALTERNATE SYNC PULSES

BACKGROUND OF THE INVENTION

This invention relates to a television horizontal frequency automatic frequency and phase control (AFPC) loop in which the loop gain or speed is periodically changed during the vertical deflection cycle.

Television displays are generated by repetitively scanning an electron beam over the surface of a picture tube viewing screen to form a lighted raster area. The picture tube electron beam intensity is modulated by video signals to form images on the screen representative of the picture to be displayed. Conventional television provides a high-speed horizontal scanning in conjunction with a relatively low-speed vertical scanning. The scanning in the vertical and horizontal directions is synchronized with synchronizing (sync) signals included in a composite video signal with the video signal to be displayed. The sync signals are extracted from the composite video, and the sync signals thus extracted are used to synchronize the vertical and horizontal scanning apparatus.

A sync separator includes a threshold circuit by which the high-amplitude horizontal and vertical synchronizing signals are separated from the lower-amplitude image information portions of the composite video to form a composite sync signal. A differentiating circuit responds to the composite sync signal selectively at and above the horizontal synchronizing frequency to produce a sequence of sync pulses. These sync pulses are coupled to a circuit having a threshold above which switching takes place to establish the arrival of a sync pulse.

The vertical synchronizing signals contained in the composite sync signal are pulses having low-frequency components. The vertical sync signal proper has a duration of three horizontal lines. In order to maintain the flow of horizontal sync information during the vertical synchronizing interval, the vertical synchronizing pulse includes serrations by which the horizontal oscillator may be synchronized. In the NTSC television system, vertical scanning of an image is accomplished during two successive field intervals, the horizontal scanning lines of which are interlaced. Interlacing requires that the vertical oscillator frequency be maintained in an exact relationship with the horizontal frequency. In order to help the vertical sync separator maintain exact timing in extracting the vertical sync pulses, equalizing pulses are provided in the composite video during a period of three horizontal lines preceding and following the vertical synchronizing intervals. The equalizing pulses recur at twice the rate of the horizontal sync pulses. The serrations during the vertical synchronizing pulse interval also recur at twice the rate of the horizontal sync pulses.

In television systems in which the composite video signals are modulated onto a carrier and broadcast, many of the television receivers are in areas far from the transmitting station, where a weak signal can be expected. Due to the presence of unavoidable thermal noise, and also due to various forms of interference signals which may occur in the vicinity of the receiver, it may be expected that the composite video as received and the synchronizing signals derived therefrom will be intermingled with electrical noise. This electrical noise is manifested as random variation of the desired signal amplitude, and can severely perturb the operation of the display device. Commonly, noisy synchronization causes vertical and horizontal jitter, or in more extreme forms "rolling" or "tearing" of the image displayed on the raster. As transmitted, the synchronizing signal pulses recur at a rate which is carefully controlled and extremely stable. Since the presence of noise obscures the synchronizing signals in a random manner, it has become common practice to obtain synchronization of the horizontal deflection circuit with the horizontal synchronizing pulse signal by the use of an oscillator, the free-running frequency of which is near the horizontal scanning frequency, and the exact frequency and phase of which is controlled in an indirect manner by a form of phase-lock loop (PLL) known as an AFPC (automatic frequency and phase control loop) to equal the synchronizing signal frequency and to maintain a tracking phase. Thus, when one or more synchronizing pulses is obscured by noise, the rate of the oscillator remains substantially unchanged, and the deflection circuits continue to receive regular deflection control pulses. Random variations in the apparent arrival time of the sync signals are averaged by the PLL loop filter, so the deflection control pulses remain in close synchronism with the video signals.

However, periods of loss of horizontal sync pulses prevent the loop from responding to changes in phase between the deflection and video signals. It is desirable to make use of all horizontal sync pulses not masked by noise, including those in the vertical sync and equalizing intervals.

Since the PLL is a feedback system, there is an undesirable residual phase error between the oscillator signal and the synchronizing signal. High loop gain is desirable in order to minimize error, but due to unbalances in the phase detector the loop then becomes more responsive to perturbing noise. Thus, a compromise between phase error and noise performance is often necessary.

With the advent of integrated circuits for low-power signal processing in television devices, it is convenient in a PLL to compare the horizontal synchronizing signals from the sync separator with a square wave as produced by the controlled horizontal oscillator rather than with a sawtooth signal, in order to save the cost of the sawtooth integrating capacitor and its interface connection.

During the synchronizing pulse interval, the PLL phase detector gates a first current source which charges a storage capacitor in a first polarity when the oscillator square wave output is high, and which turns off the first current source and turns on a second current source poled to discharge the capacitor when the oscillator output is low. Thus, when the transition time of the square-wave oscillator output is centered on the synchronizing pulse, the charging and discharging currents are equal and the net capacitor voltage does not change. This maintains the oscillator frequency constant.

With the described type of phase detector, the phase detector gain and therefore the loop gain of the PLL may decrease during the equalizing and synchronizing pulse intervals. This decrease in gain comes about because the horizontal sync separator produces sync pulses at twice the horizontal rate during the equalizing and vertical sync pulse intervals, and these double-rate pulses enable the phase detector during both the rise and fall time of the square-wave oscillator output. Consequently, a change in oscillator phase which causes a phase detector output signal of a first polarity during one sync pulse will create an output signal of the opposite polarity during the next succeeding sync pulse.

Such a decrease in gain of the PLL is particularly disadvantageous when rapid slewing of the horizontal oscillator frequency or phase is required during the vertical blanking interval. This may be the case, for example, when the television receiver is to be used to display information which has been recorded on a home-type video tape recorder. Such tape recorders often have a plurality of reproduction heads, each of which is mechanically scanned across the tape. In one common scheme, two heads are used, which alternately scan the tape for a duration equal to that of a vertical field. In order to avoid loss of, or breaks in, the displayed information, scanning of the succeeding field is commenced by the second head substantially concurrently with the end of scanning in the first head. However, slight differences in tape tension or in the dimensions of the mechanical tape transport acting on the tape for playback compared with the tension and dimensions when the tape was recorded results in differences in the time between succeeding horizontal synchronizing pulses in the information as recorded as compared with playback, especially during the switchover between heads. This results in a discontinuity or step change in the phase of the horizontal synchronizing pulses available for synchronizing the horizontal oscillator, which step normally occurs about five horizontal lines before the end of a vertical scanning interval and the beginning of the vertical blanking interval. A high oscillator slew rate during the horizontal blanking interval is necessary to conform the horizontal oscillator phase to the synchronizing signal phase after the step change, and this conformance must be complete before scanning begins for the next succeeding field.

It is known from U.S. Pat. No. 3,846,584 issued Nov. 5, 1974 to Itoh to disconnect the loop filter from the PLL in order to increase gain for an interval immediately following the appearance of vertical sync signal, but a decrease in phase detector gain during the equalizing and vertical synchronizing pulse intervals as may be occasioned by the presence of equalizing pulses or serrations may nevertheless prevent rapid slewing of the horizontal oscillator and therefore prevent accommodation of such a step change. This may result at the top of the raster in an apparent bending or tearing of vertical lines in the displayed image. Even when the synchronizing signals associated with the video to be displayed do not have a step change in phase, the decrease in PLL gain during the equalizing and vertical synchronizing pulse intervals may be disadvantageous. This may occur, for example, in those cases in which the first and second gated current sources in the described type of phase detector have unequal amplitudes. Unequal charge and discharge currents results in a progressive change in the horizontal oscillator control signal and may result in driving the oscillator off-frequency during the equalizing and vertical synchronizing intervals in which the PLL gain is low. If the loop filter is disconnected during this interval as suggested by Itoh, the oscillator may drift off-frequency very quickly, and there may then be insufficient time remaining before the beginning of the next following scanning interval for correction, resulting in an apparent bending or tearing of vertical lines in the displayed image.

SUMMARY OF THE INVENTION

A television phase-lock apparatus for the horizontal oscillator of a television includes a control oscillator and a phase detector having an input coupled to the output of the oscillator. An output terminal of the phase detector is coupled to a frequency or rate control input terminal of the oscillator for forming a phase-lock loop by which the oscillator's signals are maintained in synchronism with signals which may be applied to a second input terminal of the phase detector. Recurrent horizontal synchronizing signals are applied to the second input terminal of the phase detector by way of gating circuits. The horizontal synchronizing signals include horizontal rate pulses and also include interstitial pulses which occur in the intervals between successive horizontal rate pulses. The interstitial pulses occur during a portion of the vertical blanking interval. Gating circuits are coupled to the phase detector for preventing the phase detector from producing an output signal in response to the interstitial pulses. Consequently, the phase-lock apparatus responds to the horizontal-rate synchronizing pulses and not to the interstitial pulses.

DESCRIPTION OF THE DRAWING

FIG. 1a illustrates in block and schematic diagram form a television receiver including an AFPC loop according to the prior art;

FIG. 1b illustrates in schematic diagram form a switchable loop filter time constant suitable for use with the AFPC loop of FIG. 1a;

DESCRIPTION OF THE INVENTION

Figures 1A, 1B:
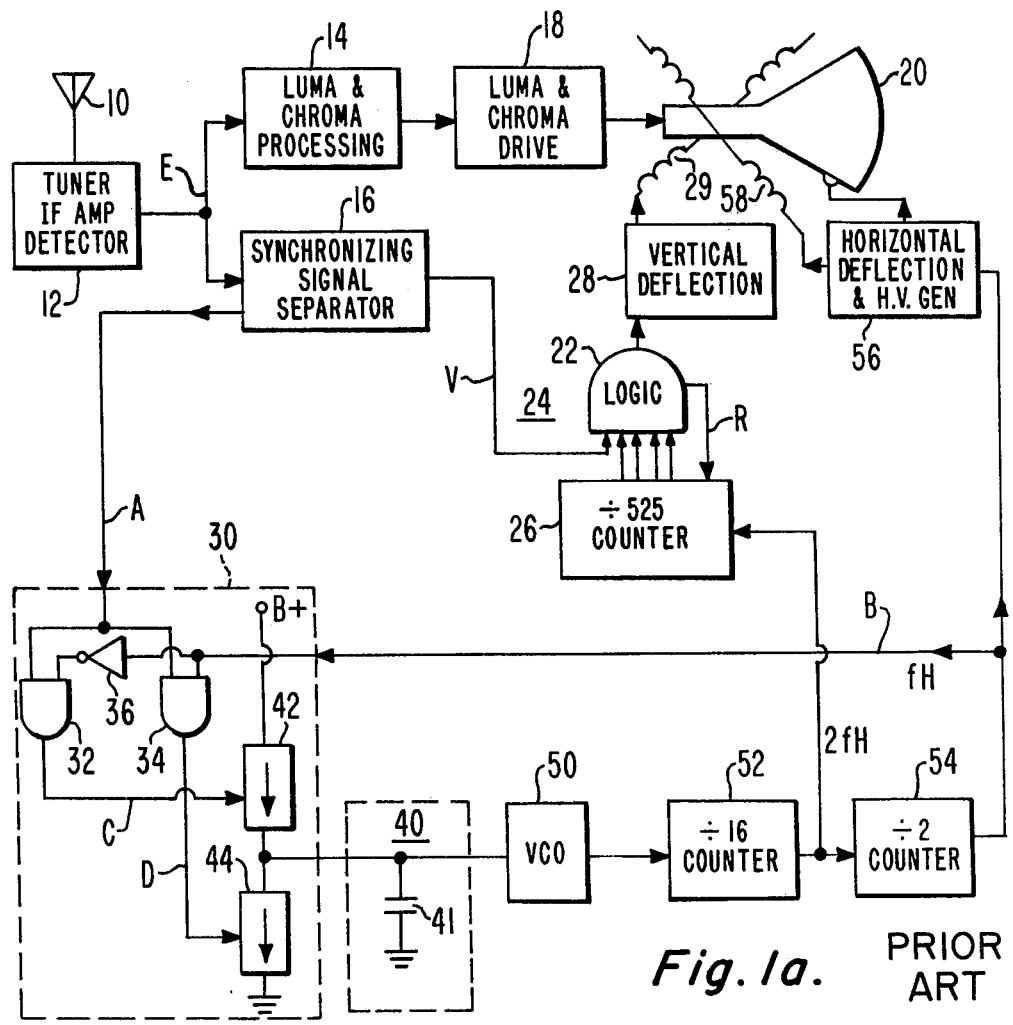

In FIG. 1, a television receiver includes an antenna 10 for receiving broadcast television signals. Antenna 10 is coupled to a tuner, intermediate-frequency (IF) amplifier and video detector illustrated together as a block 12, for producing composite video which is coupled by way of a conductor E to appropriate luminance and chrominance processing circuits illustrated as a block 14 and also to a synchronizing signal separator illustrated as a block 16. The luminance and chrominance information generated by processing circuit 14 is coupled to the elements (not shown) of a kinescope 20 by means of appropriate luminance and chrominance drive circuits illustrated as a block 18.

Synchronizing signal separator 16 separates the vertical synchronizing signals from the composite video and couples them by way of a conductor V to the logic portion 22 of a vertical count-down arrangement designated generally as 24, which also includes a divide-by-525 counter 26. Vertical count-down arrangement 24 produces counterderived vertical drive signals which are synchronized by the vertical synchronizing pulses accepted as such by logic circuit 22. Such count-down arrangements are known and are described for example in U.S. Pat. No. 3,688,037 issued Aug. 29, 1972 to Ipri and in U.S. Pat. No. 3,878,335 issued Apr. 15, 1975 to Balaban.

The vertical drive signals produced by logic circuit 22 are applied to a vertical deflection circuit 28, which produces a recurrent sawtooth current in vertical deflection windings 29 associated with kinescope 20.

Synchronizing signal separator 16 also separates horizontal (H) synchronizing signals from the composite video and applies them by way of the conductor A to a phase detector designated generally as 30. Phase detector 30 includes first and second AND gates 32 and 34, each of which has an input coupled to conductor A. A phase-lock loop filter designated generally as 40 includes a filter capacitor 41, one end of which is connected to ground. The other end of capacitor 41 receives charging current from B+ through a gated current source 42. A second gated current source 44 is coupled in parallel with capacitor 41 for discharging the capacitor. Gated current source 42 is controlled by the output of AND gate 32, and gated current source 44 is controlled by the output of AND gate 34. The output signal of phase detector 30 is filtered by loop filter 40 and applied to a voltage controlled oscillator (VCO) illustrated as a block 50. Oscillator 50 produces output signals at a high frequency such as 503 kHz, which are coupled to the input of a divide-by-16 counter 52. The twice-horizontal-frequency (2fH) output of counter 52 is applied to counter 26 as a clock input and to a divide-by-2 counter 54 to generate horizontal deflection drive signals at the horizontal frequency (fH). The fH signals from counter 54 are applied to a horizontal deflection and high voltage generating circuit designated 56 which produces ultor voltage for kinescope 20 and also produces a sawtooth deflection current through horizontal deflection coils 58 associated with kinescope 20.

The phase-lock loop is closed by coupling the fH output of counter 54 to a second input of AND gate 34 and, by way of an inverter 36, to a second input of AND gate 32.

In operation, the tuner of FIG. 1 selects a broadcast carrier signal, mixes it to an IF frequency, amplifies and detects it to produce composite video signals representative of the information in the selected broadcast signal. The color and luminance portions of the composite video are coupled to the control elements of the kinescope by processing circuits 14 and drive circuits 18, as mentioned, and the vertical synchronizing signals separated by separator 16 control the vertical deflection.

Figure 2:
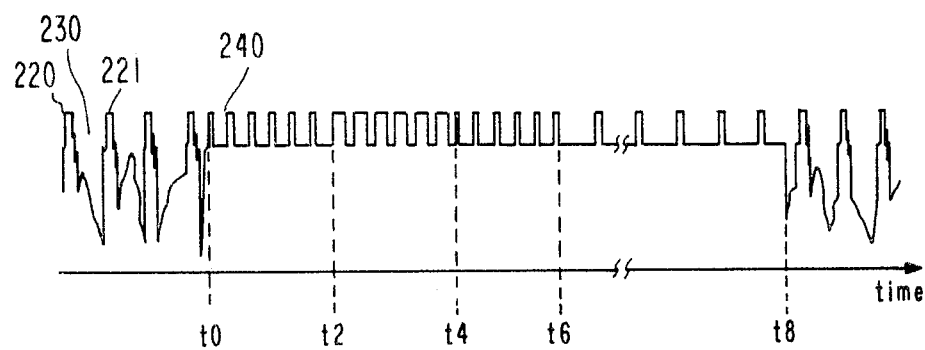
FIGS. 2 and 3 illustrate as amplitude-time diagrams certain voltage and current waveforms illustrating the operation of the arrangement of FIG. 1.

An amplitude-time plot of the composite video on conductor E at a time near the vertical blanking interval is illustrated in FIG. 2. The vertical blanking interval extends from time T0 at which the vertical blanking interval begins to a time T8, and has a duration approximately equal to that of 19 horizontal lines. The vertical scanning interval before time T0 and extending from time T8 to the next following time T0 contains video information and horizontal synchronizing signals. The horizontal synchronizing signal such as pulses 220, 221 are separated by interstices such as 230 which contain the video information at a lower amplitude than the synchronizing pulses.

The vertical synchronizing information in the composite video illustrated in FIG. 2 occurs in the interval between times T2 and T4 of the vertical blanking interval. During interval T2-T4, six wide pulses separated by five serrations allow the integrator portion (not shown) of the sync separator to charge to a threshold. Because of the half-horizontal line difference in the starting time of each successive vertical field, the horizontal synchronizing pulses such as 220, 221 if carried through the interval T0-T2 would cause the RC integrator to assume slightly different charges in successive fields at time T2 at which the synchronizing interval begins. This might cause recurrent changes in the triggering of the synchronizing signal separator threshold device and might result in erratic or incorrect interlace. In order to avoid this problem, the composite video in time T0-T2 includes equalizing pulses such as 240, which recur at twice the horizontal rate. Thus, there is no difference in the interval T0-T2 preceding the vertical synchronizing interval between an even field and an odd field, and the charge on the RC integrator at time T2 tends to remain constant. Because successive fields have a one-half line difference in vertical sync phasing, interlace also requires that the serrations occur at twice the horizontal frequency to maintain the phasing of the integrator output constant relative to the start of the vertical sync pulses.

Figure 3:
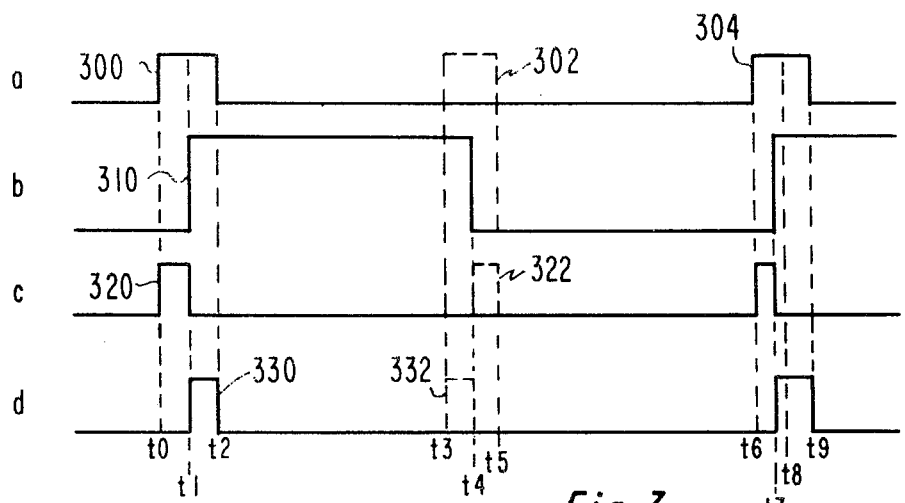

In operation during the vertical scanning interval, sync signal separator 16 produces on conductor A synchronizing signal pulses illustrated by the solid-line waveform 300 in FIG. 3a. Pulse 300 has a duration from time T0 to time T2 of FIG. 3, which substantially coincides with the time of a horizontal pulse such as pulse 220 illustrated in FIG. 2. The PLL responds to the pulses, and oscillator 50 together with counters 52 and 54 produce on conductor B a square wave illustrated as 310 in FIG. 3b, which square wave has a transition centered at a time T1 between times T0 and T2. AND gates 32 and 34 are enabled to respond to the signals at their second inputs when a sync pulse such as 300 is produced on conductor A. Thus, gates 32 and 34 are enabled for conduction in the interval T0-T2 of FIG. 3. In the interval T0-T1 when square wave 310 is low, inverter 36 applies a high signal to the second input of gate 32, producing at the output of gate 32 a current source gating pulse illustrated as 320 in FIG. 3c. Current source 42 responds with a current pulse which charges capacitor 41, which current pulse may also be illustrated by pulse 320.

In the interval T1-T2, both sync pulse 300 and square wave 310 are high, which enables gate 34 to produce a gating pulse illustrated as 330 in FIG. 3d. With square wave 310 high, inverter 36 drives an input of gate 32 low and gating pulse 320 produced by AND gate 32 ends. Thus, in the interval T1-T2 charging current source 42 does not conduct and discharging current source 44 conducts. So long as time T1 at which the transition of square wave 310 occurs remains centered in the interval T0-T2, gating pulses 320 and 330 will have equal duration, and gates 32 and 34 conduct alternately. If current sources 42 and 44 have equal magnitude, zero net change in charge on capacitor 41 results.

If, as illustrated in the interval T6-T9, the phase of oscillator square wave output signal 310 deviates, the transition of the square wave occurs at a time T7 which is not centered in the interval T6-T9. This results in charging current pulse 320 and discharging current pulse 330 having unequal durations, and will cause a net change in the capacitor voltage, whereby the frequency and phase of horizontal oscillator 50 are slewed in a feedback manner to maintain the transition centered on the synchronizing pulse.

During the vertical synchronizing and equalizing pulse intervals T0-T6 as illustrated in FIG. 2, the equalizing pulses and the serrations at twice the horizontal rate cause a double-rate response of synchronizing signal separator 16. Thus, in addition to pulses 300, 304 as illustrated in FIG. 3a, additional interstitial pulses such as 302 are produced on conductor A. The effect of an additional pulse 302 in the interval T3–T5 is to enable gates 32 and 34 for conduction. Square wave 310 may have a transition in this interval, as illustrated by FIG. 3b. In the interval T3–T4, pulse 302 and sqare wave 310 enable discharging current source 44 to produce a further discharging current illustrated as 332, and in the interval T4–T5 produce a gating pulse such as 322 which enables charging current source 42. A change in phase of the oscillator waveform illustrated in FIG. 3b would produce a change in duration of pulse 322 equal in size and opposite in polarity to the change in duration of pulse 320. This is also true of pulse 332 relative to pulse 330. The result of this additional response during the vertical synchronizing and equalizing pulse intervals is to render the phase detector relatively unresponsive to changes in phase.

As mentioned, lack of response to phase changes corresponds to a low-gain condition of the phase detector, which is particularly disadvantageous when the PLL must operate upon the video signals produced by a tape recorder wherein the oscillator must slew at a high rate at some time near the vertical blanking interval. Moreover, the low PLL gain may allow the oscillator to slew away from the correct phase even when there is no step change in the phase of the input signal. This can happen, for example, if current sources 42 and 44 are not perfectly matched in amplitude. There will be a net unbalance in current which will change the charge on capacitor 41 and result in oscillator slewing, which will require additional time to recover to the correct phase after the end of the equalizing pulse interval. The rate of slewing away from the correct phase may be exceptionally large during the low-gain condition when, as illustrated in FIG. 1b, the loop filter is switchable to a high-speed condition. Such switching is described in the aforementioned Itoh patent and in U.S. Pat. No. 4,144,544 issued to Fernsler.

Figure 4:
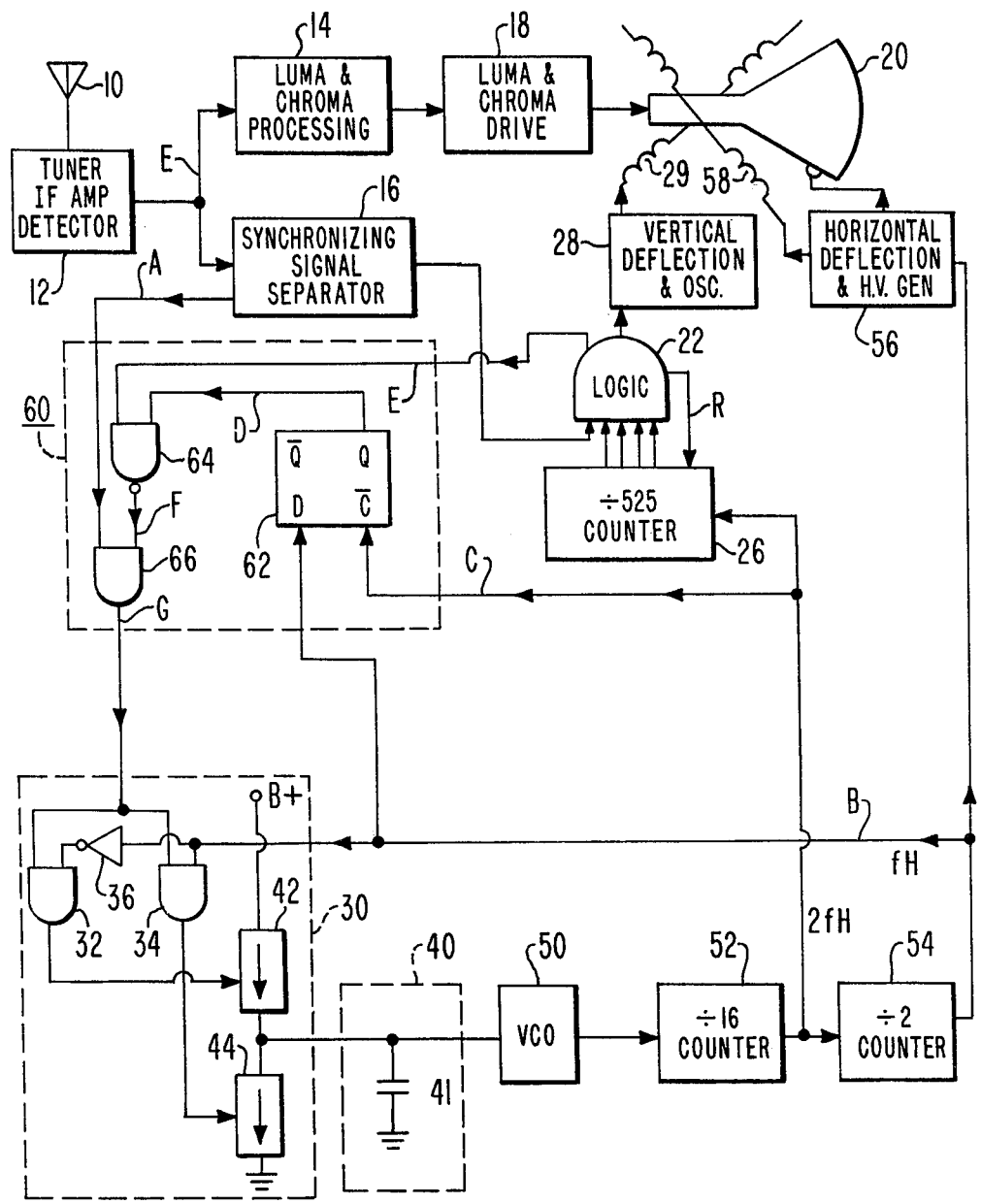
FIG. 4 illustrates in block and schematic diagram form a television receiver embodying the invention.

FIG. 4 illustrates in block diagram form a television receiver embodying the invention. Those elements of FIG. 4 corresponding to elements of FIG. 1 are designated by the same reference numbers. In FIG. 4, a logic circuit designated generally as 60 acts as a switch interposed between sync signal separator 16 and phase detector 30. Generally speaking, gated circuits 60 allow synchronizing pulses to flow to phase detector 30 for locking the horizontal deflection drive to the synchronizing signals. Alternate equalizing pulses, however, are not allowed to pass to the phase detector (i.e., the switch is opened during alternate equalizing pulses), so the phase detector and the PLL do not respond to the alternate equalizing pulses so that full PLL loop gain is maintained through the vertical synchronizing and equalizing pulse intervals.

Gating circuit 60 includes a data-type (D) flip-flop (FF) 62, the D input of which is connected to conductor B to receive fH signals from counter 54. The clock input of FF62 is connected by way of a conductor C to the 2fH output of counter 52. The Q output of FF 62 is coupled to an input of a NAND gate 64 by a conductor D. The other input of NAND 64 is coupled to logic circuit 22 over a conductor E. The output of NAND 64 is coupled to an input of AND gate 66 by a conductor F. The other input of AND 66 receives sync pulses from separator 16 by conductor A. The output of AND 66 is coupled to phase detector 30 by a conductor G.

In operation, sync separator 16 produces on conductor A recurrent sync pulses illustrated as 300 in FIG. 5a. The sync pulses recur at twice the horizontal rate in the interval between T0 and T6, corresponding to the vertical synchronizing and equalizing pulse intervals, as described in conjunction with FIG. 2. The fH output of counter 54 on conductor B is illustrated by voltage wavefrom 310 in FIG. 5b. The 2fH output of counter 52 applied to FF 62 over conductor C is illustrated as waveform 500 of FIG. 5c. During each negative-going transition of waveform 500, the logic level applied to the D input of FF62 is transferred to the Q output and held until the next negative-going transition of waveform 500. The signal at the Q output is illustrated by waveform 510 of FIG. 5d. It will be noted that waveform 510 is similar to waveform 310 but is shifted in phase by 90°. The input to NAND 64 on conductor E is illustrated as waveform 520 in FIG. 5e. Waveform 520 remains low during the entire vertical scanning interval, and goes high at a time near time 0, the time at which the vertical scanning interval ends and the vertical blanking interval begins. Waveform 520 remains high until a later time such as T6 at which the equalizing pulses end. The exact starting and ending time of waveform 520 is not critical to the invention. Generation of signals such as 520 in a vertical count-down are well-known in the art and require no further description here. NAND 64 is inhibited by signal 520 during the vertical scanning interval preceding time T0, and can respond to phase-shifted signal 510 on conductor D only during the interval T0–T6 during which signal 520 is high. In the interval T0–T6, NAND 64 produces on conductor F a signal illustrated as 530 in FIG. 5f, which in that interval is the inverse of phase-shifted waveform 510. When signal 530 is high, AND gate 66 is enabled and can pass sync pulses. During those intervals in which signal 530 is low, AND 66 is inhibited, and cannot pass synchronizing pulses from separator 16 to phase detector 30. Since waveform 530 is shifted in phase with respect to fH signal 310 it is also shifted in phase relative to sync pulses 300. That is, rather than the transition in signal 530 coinciding with the transitions of sync pulses 300, sync pulses 300 occur when signal 530 is either high or low. Thus, every other sync pulse 300 is prevented from reaching phase detector 30 in the interval T0–T6, as illustrated by signal 540 in FIG. 5g. In FIG. 5g, solid line 540 illustrates the signals passing through conductor A to conductor G through AND 66, and the dotted pulses 542 illustrate the alternate equalizing pulses which are gated out.

Figure 5:
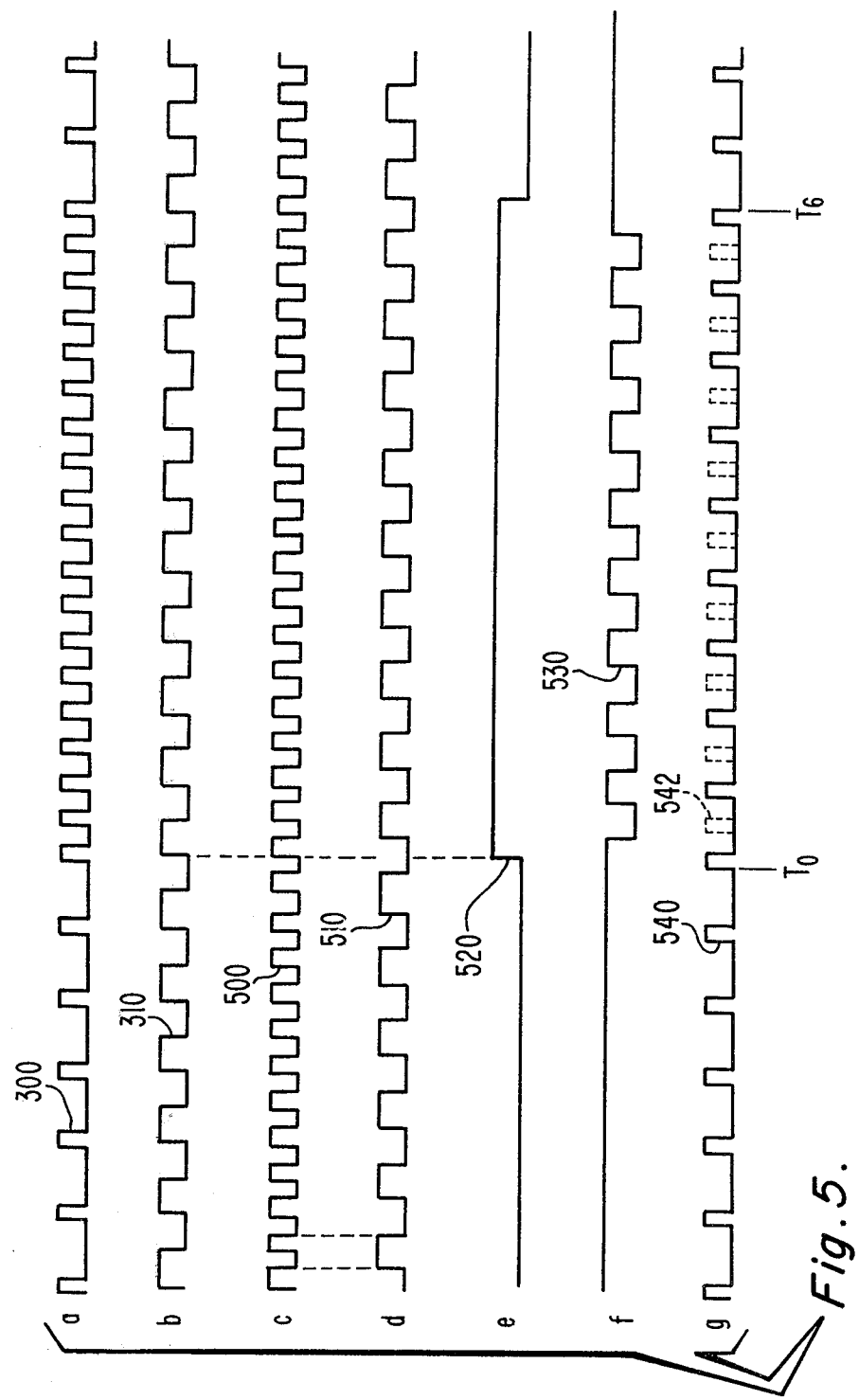
FIG. 5 illustrates as amplitude-time plots a timing diagram illustrating the operation of the arrangement of FIG. 4.

With the arrangement shown in FIG. 4 during the vertical sync and equalizing intervals, the phase detector receives synchronizing pulses only in the region of positive-going transitions of fH signal 310, and not in the region of negative-going transitions. Thus, the gain of the PLL is maintained even during the equalizing intervals. It should be noted that the pulse waveforms illustrated in FIGS. 3 and 5 are exaggerated for clarity and are therefore not exactly to scale.

Figure 6:
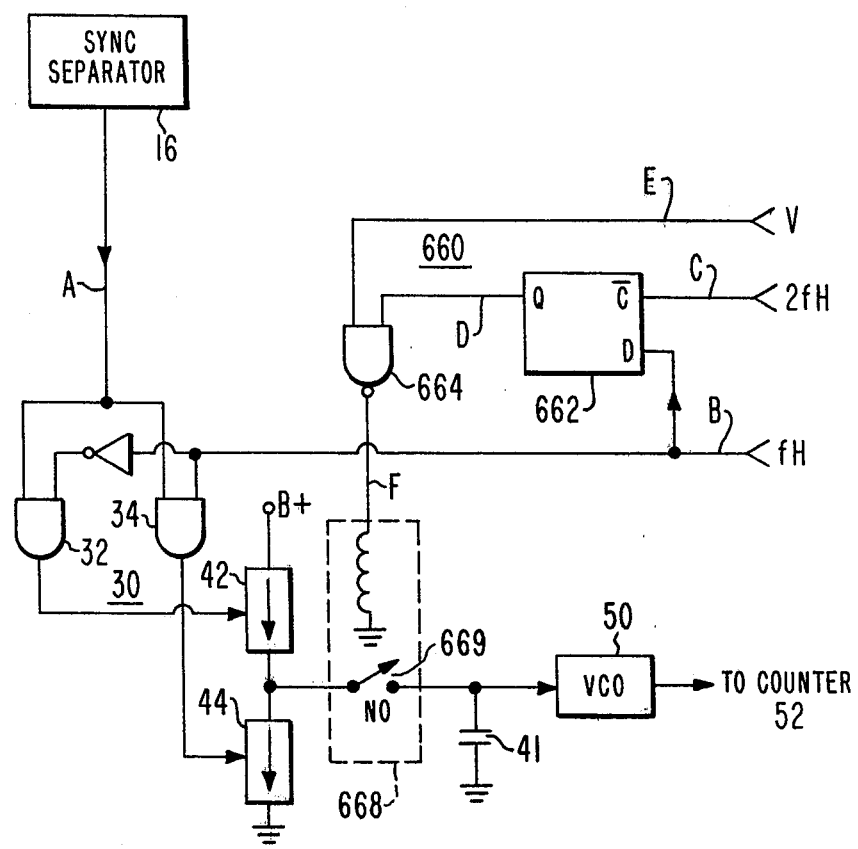
FIG. 6 illustrates an alternative embodiment of the invention.

Other arrangements can inhibit the effect of the phase detector on the PLL during alternate equalizing pulses. FIG. 6 illustrates a portion of a television receiver embodying the invention. In FIG. 6, a phase detector designated generally as 30 and identical with those described in conjunction with FIGS. 1 and 4 receives separated horizontal synchronizing pulses such as signals 300 over a conductor A. A switch illustrated as a relay 668 includes a normally-open switch contact 669 coupling the output of phase detector 30 to loop filter capacitor 41 for filtering the control signal for application to VCO 50. A gating circuit designated generally as 660 includes a D FF 662 and a NAND 664. FF 662 receives fH pulses over a conductor B from the output of a counter chain (not shown). A clock input of FF 62 receives 2fH signals over a conductor C from the 2fH output of the counter chain (not shown). A signal similar to signal 510 of FIG. 5d is coupled to NAND 664 over a conductor D. A signal similar to signal 520 of FIG. 5e is coupled to the other input of NAND 664 over a conductor E. NAND 664 applies a signal similar to 30 of FIG. 5f to the coil relay 668 over a conductor F. During the intervals in which signal 530 is high, the coil of relay 668 is energized and the switch is closed. This allows the flow of charge and discharge currents through filter capacitor 41 in response to sync pulses 300. During those intervals in which signal 530 is low, which intervals correspond with alternate equalizing pulses in the interval T0-T6, the relay coil is deenergized and the normally open contacts open thereby preventing current from flowing in capacitor 41 notwithstanding that the current sources are energized. Thus, the arrangement of gating circuit 660 and relay 668 prevents an output from being generated by phase detector 30 during alternate equalizing pulses.

Other embodiments of the invention will be obvious to those skilled in the art. For example, the actual operating components of phase detector 30 can be disabled during the alernate equalizing pulses, as for example by breaking the connection between AND gates 32 and 34 and the controlled current sources 42 and 44. The relay illustrated in FIG. 6 may be replaced by an appropriate transmission gate. The VCO output signal applied to the phase detection may be derived from horizontal deflection circuit 56 rather than from counter 54. The VCO may operate directly at the H frequency, thereby avoiding the need for counters.

What is claimed is:

1. A television phase-lock loop apparatus for the horizontal oscillator of a television receiver, comprising:
   controllable oscillator means including an output terminal at which oscillator signals are generated and also including a control input terminal;
   phase detection means including a first input terminal coupled to the output terminal of said controllable oscillator means, a second input terminal, and an output terminal coupled to the control input terminal of said controllable oscillator means;
   a source of horizontal synchronizing signals having an output terminal, said synchronizing signals including horizontal-rate pulses, said synchronizing signals also including interstitial pulses occuring in the interval between said horizontal rate pulses, said interstitial pulses occurring during at least a portion of the vertical blanking interval; and
   means having a first input coupled to said output terminal of said controllable oscillator means, a second input coupled to the output terminal of said source of horizontal synchronizing signals, and an output coupled to the second input terminal of said phase detection means for forming a phase-lock loop apparatus responsive to said synchronizing signals for locking the frequency and controlling the phase of said oscillator means,
   wherein said forming means further comprises controlled inhibiting means for preventing said phase detection means from producing an oscillator control signal in response to said interstitial pulses whereby the phase-lock loop apparatus responds to said horizontal rate synchronizing pulses to the exclusion of said interstitial pulses.

2. An apparatus according to claim 1 wherein said inhibiting means comprises controllable switch means.

3. An apparatus according to claim 1 wherein said inhibiting means comprises controllable switch means coupled between said source of synchronizing signals and said phase detection means for gating said horizontal-rate signals to said second input terminal of said phase detection means and for preventing said interstitial pulses from reaching said second input terminal of said phase detection means.

4. An apparatus according to claim 1 wherein said inhibiting means comprises controllable switch means for inhibiting operation of said phase detection means, said controllable switch means being operated at least during said interstitial pulses for preventing said phase-lock loop from responding thereto.

5. An arrangement according to claim 1 wherein said inhibiting means comprises controllable switch means coupled with said phase detection means for preventing generation of a phase detector output signal in response to said interstitial pulses, and further comprising timing means coupled to said controllable switch means for operating said controllable switch means at a time related to the anticipated arrival time of said interstitial pulses.

6. An arrangement according to claim 5, wherein said timing means comprises means couples to said output terminal of said controllable oscillator means for phase-shifting said oscillator signals, means for gating said controllable switch means in response to said phase-shifted oscillator signals, and means for inhibiting said gating except during the expected time of arrival of said interstitial pulses.

7. A television phase-lock apparatus for the horizontal oscillator of a television receiver comprising:
   a source of horizontal synchronizing signals having an output terminal, said synchronizing signals including horizontal-rate pulses, said synchronizing signals also including interstitial pulses occurring in the interval between said horizontal-rate pulses, said interstitial pulses occurring during at least a portion of the vertical blanking interval;
   controllable oscillator means including an output terminal at which oscillator signals are generated and also including a control input terminal;
   a phase detector having a first input terminal coupled to the output terminal of said source of horizontal synchronizing signals, a second input terminal coupled to the output terminal of said controllable oscillator means, and an output terminal; and
   means for coupling the output terminal of said phase detector to the control input terminal of said controllable oscillator means, said coupling means including controllable switch means for preventing said controllable oscillator means from responding to said interstitial pulses, whereby the phase-lock apparatus responds to said horizontal-rate pulses to the exclusion of said interstitial pulses.

8. An improved television AFPC arrangement, comprising:

a VCO having a rate control input terminal and an output terminal;

a phase detector including a first input terminal and a second input terminal coupled to said output terminal of the VCO and also including an output terminal coupled to said rate control input terminal of said VCO for forming a phase-lock loop responsive to signals applied to said first input terminal for locking the frequency of said VCO to that of said signals;

a source of horizontal sync signals, said sync signals including horizontal-rate pulses and also including equalizing pulses occurring during a portion of the vertical blanking interval;

means coupled between said source of horizontal sync signals and said first input terminal of said phase detector for applying said horizontal sync signals to said phase detector, said means for applying said horizontal sync signals further comprising a switch coupled between said source of horizontal sync pulses and said phase detector which is controlled for preventing alternate one of said equalizing pulses from being applied to said phase detector.

9. An improved AFPC arrangement, comprising:

a VCO having an input terminal and an output terminal for generating an output signal;

a source of horizontal sync signals, said sync signals including horizontal-rate pulses and also including equalizing pulses during at least a portion of the vertical blanking interval;

a phase detector including a first input terminal coupled to said source of sync signals and a second input terminal coupled to said output terminal of said VCO for generating a control signal representative of the frequency and phase difference between said sync signals and the output signal of said VCO; and means for controllably applying said control signal to said input terminal of said VCO for forming a phase-loop by which said output signal of said VCO is locked with said sync pulses;

wherein the improvement lies in that said applying means comprises controlled switch means for preventing said control signal from being applied to said VCO during the occurrence of alternate ones of said equalizing pulses.

* * * * *